United States Patent
Choi et al.

(10) Patent No.: US 10,564,437 B2
(45) Date of Patent: Feb. 18, 2020

(54) OPTICAL LAYER AND DISPLAY DEVICE INCLUDING THE SAME

(71) Applicant: Samsung Electronics Co., Ltd., Suwon-si, Gyeonggi-do (KR)

(72) Inventors: Kyuhwan Choi, Yongin-si (KR); Young Ju Jeong, Yongin-si (KR); Byong Min Kang, Yongin-si (KR); DongKyung Nam, Yongin-si (KR); Jinho Lee, Suwon-si (KR); Yoonsun Choi, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 327 days.

(21) Appl. No.: 15/384,967

(22) Filed: Dec. 20, 2016

(65) Prior Publication Data

US 2017/0184869 A1   Jun. 29, 2017

(30) Foreign Application Priority Data

Dec. 24, 2015  (KR) .................. 10-2015-0186272

(51) Int. Cl.
*G02B 27/22*   (2018.01)

(52) U.S. Cl.
CPC ....... *G02B 27/2214* (2013.01); *G02B 27/225* (2013.01)

(58) Field of Classification Search
CPC .............. G02B 27/22; G02B 27/2214; G02B 27/2228; G02B 27/2257; G02B 27/2235; G02B 27/225; G02B 27/2264; G02B 27/017; G02B 27/26; G02B 27/44; G02B 27/46; G02B 27/4211; G02B 27/143–145; G02B 27/106; G02B 5/32; G02B 5/0252; G02B 5/203; G02B 5/1814; G02B 5/1866; G02B 5/1871; G02B 5/1876; G02B 5/1857; G02B 5/285; G02B 1/113; G02B 1/11; G02B 1/115; G02B 3/005; G02B 3/0031; G02B 3/0056; G02B 3/0062; G02B 3/0012; G03H 1/00; G03H 1/028; G03H 1/0011; G03H 1/0244; G03H 1/02; G03H 1/0248; G03H 1/26; G03H 1/268; G03G 1/16;
(Continued)

(56) References Cited

U.S. PATENT DOCUMENTS 6,825,985 B2   11/2004   Brown et al.
8,614,772 B2   12/2013   Lin
(Continued)

FOREIGN PATENT DOCUMENTS

JP   4968943 B2   7/2012
JP   5018222 B2   9/2012
(Continued)

*Primary Examiner* — Stephone B Allen
*Assistant Examiner* — Jyotsna V Dabbi
(74) *Attorney, Agent, or Firm* — Harness, Dickey and Pierce, P.L.C.

(57) ABSTRACT

An optical layer and a display device including the same, where the optical layer includes optical components slanted a angle $\theta$ with respect to a pixel included in a display panel, and disposed at an interval of a pitch l, and the slant angle $\theta$ and the pitch l satisfy $l=2g\times\tan(VA_L/2)$ and $a=l/(2g\times\tan(VA_P/2))$.

15 Claims, 13 Drawing Sheets

(58) Field of Classification Search
CPC . G11B 7/0065; G11B 7/24044; G11B 7/1353; B42D 15/0026; B42D 15/10; B42D 15/105; B42D 15/0013; H04N 9/3197; H04N 9/3105; H04N 13/04; H04N 13/0404–0406; H04N 13/0409; H04N 13/0497; H04N 13/0239; H04N 13/0055; H04N 13/0296; H04N 13/0431; H04N 13/0242; H04N 13/0048; H04N 13/021; H04N 13/0221; H04N 13/0037; H04N 13/0051; H04N 13/044; H04N 13/0438; H04N 13/0003; H04N 13/0422; H04N 13/0434; H04N 13/0459; G03B 35/00–12; G03B 35/20; G03B 31/06; G03B 31/00
USPC ...... 359/462–464, 466; 348/42–60; 353/7–9; 349/8–9, 15
See application file for complete search history.

(56) References Cited

U.S. PATENT DOCUMENTS

| | | | |
|---|---|---|---|
| 8,692,871 B2* | 4/2014 | Harrold | H04N 13/0497 |
| | | | 348/51 |
| 2011/0001803 A1* | 1/2011 | De Zwart | H04N 13/317 |
| | | | 348/51 |
| 2013/0215111 A1 | 8/2013 | Yokoyama | |

FOREIGN PATENT DOCUMENTS

| | | |
|---|---|---|
| JP | 5521380 B2 | 6/2014 |
| KR | 2010-0005268 A | 1/2010 |
| KR | 2010-0131449 A | 12/2010 |
| KR | 2012-0021074 A | 3/2012 |
| KR | 2013-0063311 A | 6/2013 |
| KR | 2014-0079532 A | 6/2014 |

* cited by examiner

OPTICAL LAYER AND DISPLAY DEVICE INCLUDING THE SAME

CROSS-REFERENCE TO RELATED APPLICATION

This application claims under 35 U.S.C. § 119 to Korean Patent Application No. 10-2015-0186272, filed on Dec. 24, 2015, in the Korean Intellectual Property Office, the entire contents of which are incorporated herein by reference in its entirety.

BACKGROUND

1. Field

At least one example embodiment relates to an optical layer and/or a display device including the same.

2. Description of the Related Art

In general, a three-dimensional (3D) image may be implemented based on a stereo vision principle through both eyes of a human. A 3D image display may include a stereoscopic display and an autostereoscopic display. The stereoscopic display may acquire a 3D image using separate left and right images without the need of glasses. The stereoscopic display may include, for example, a parallax barrier display and a lenticular display.

The parallax barrier display and the lenticular display may be difficult to change once designed. Considering such an issue, technologies to implement a high-quality 3D image irrespective of whether a 3D image display is disposed in a landscape mode or a portrait mode are being developed.

SUMMARY

Some example embodiments relate to an optical layer.

In some example embodiments, the optical layer may include optical components slanted an angle θ with respect to a pixel included in a display panel, each of the optical components spaced apart at a distance l, wherein the angle θ and the distance l satisfy Equations 1 and 2, $$l=2g\times\tan(VA_L/2) \quad \text{[Equation 1]}$$

$$a=l/(2g\times\tan(VA_P/2)), \quad \text{[Equation 2]}$$

wherein a corresponds to tan θ, g denotes a distance between the display panel and the optical layer, $VA_L$ denotes a viewing angle when the display panel is operating in a landscape mode, and $VA_P$ denotes a viewing angle when the display panel is operating in a portrait mode.

In some example embodiments, the angle θ satisfies 0.4<a=tan θ<1.

In some example embodiments, the distance l satisfies 1 pixel<l<8 pixel with respect to the pixel included in the display panel.

In some example embodiments, the viewing angle $VA_L$ satisfies Equation 3, $$VA_L=2\tan^{-1}(l/(2g)). \quad \text{[Equation 3]}$$

In some example embodiments, the viewing angle $VA_P$ satisfies Equation 4, $$VA_P=2\tan^{-1}(l/(2ga)). \quad \text{[Equation 4]}$$

In some example embodiments, the angle θ is a slant angle at which the optical components are slanted with respect to a vertical component of the pixel included in the display panel.

In some example embodiments, each of the viewing angle $VA_L$ and the viewing angle $VA_P$ has a minimum value of 3 degrees and a maximum value proportional to a size of the display panel.

In some example embodiments, the maximum value of the viewing angle $VA_L$ is greater than the maximum value of the viewing angle $VA_P$.

In some example embodiments, the optical components include at least one of a parallax barrier and a lenticular lens, the parallax barrier configured to selectively transmit light incident to the optical layer, and the lenticular lens configured to refract light incident to the optical layer based on a rule.

In some example embodiments, the optical components include at least one of a liquid crystal barrier and an electro-wetting element corresponding to active three-dimensional (3D) optical devices.

In some example embodiments, the optical layer is configured to provide light emitted from a backlight unit (BLU) to the display panel by selectively transmitting or refracting the light based on a rule.

In some example embodiments, the display panel is configured to display a 3D image using light emitted from a backlight unit (BLU), and the optical layer is configured to provide light incident from the display panel to a user by selectively transmitting or refracting the light based on a rule.

Some example embodiments relate to a display device.

In some example embodiments, the display device includes a backlight unit (BLU); a display panel configured to display an image using light generated by the BLU; and an optical layer including optical components slanted an angle θ with respect to a pixel included in the display panel, and each of the optical components spaced apart a distance l, wherein the angle θ satisfies 0.4<a=tan θ<1, and the distance l satisfies 1 pixel<l<8 pixel with respect to the pixel included in the display panel.

In some example embodiments, the angle θ and the distance l satisfy Equations 1 and 2, $$l=2g\times\tan(VA_L/2) \quad \text{[Equation 1]}$$

$$a=l/(2g\times\tan(VA_P/2)), \quad \text{[Equation 2]}$$

wherein a corresponds to tan θ, g denotes a distance between the display panel and the optical layer, $VA_L$ denotes a viewing angle when the display panel is operating in a landscape mode, and $VA_P$ denotes a viewing angle when the display panel is operating in a portrait mode.

In some example embodiments, the viewing angle $VA_L$ is satisfies Equation 3, $$VA_L=2\tan^{-1}(l/(2g)). \quad \text{[Equation 3]}$$

In some example embodiments, the viewing angle $VA_P$ satisfies Equation 4, $$VA_P=2\tan^{-1}(l/(2ga)). \quad \text{[Equation 4]}$$

In some example embodiments, each of the viewing angle $VA_L$ and the viewing angle $VA_P$ has a minimum value of 3 degrees and a maximum value proportional to a size of the display panel.

In some example embodiments, the optical components include one or more of a parallax barrier, a lenticular lens, a liquid crystal barrier, and an electro-wetting element.

In some example embodiments, the optical layer is configured to provide light emitted from the BLU to the display panel by selectively transmitting or refracting the light based on a rule.

In some example embodiments, the display panel is configured to display a three-dimensional (3D) image using light emitted from the BLU, and the optical layer is configured to provide light incident from the display panel to a user by selectively transmitting or refracting the light based on a rule.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
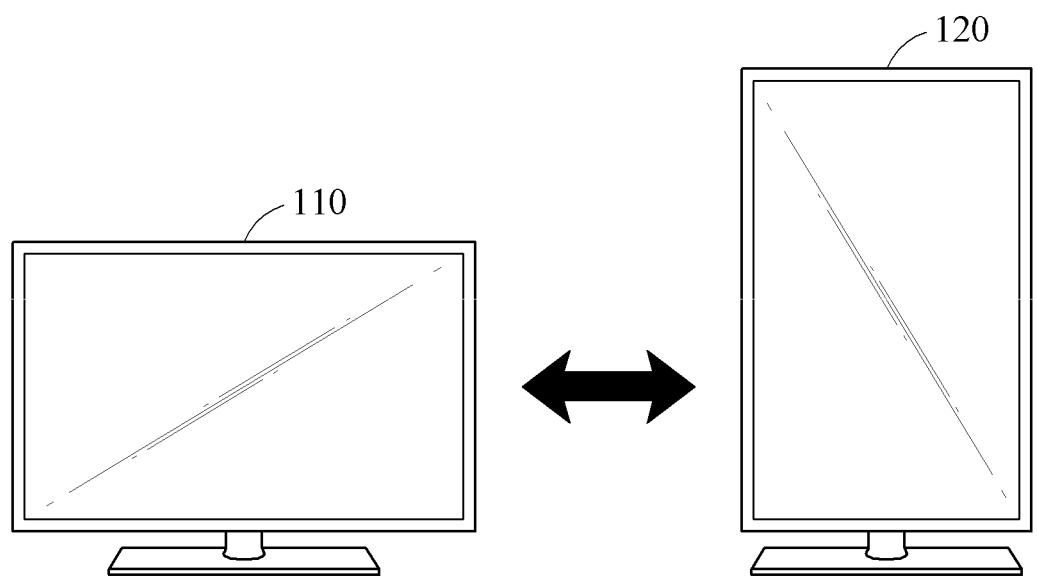
FIG. 1 illustrates operating modes of display devices according to at least one example embodiment.

Specific structural or functional descriptions are provided in the present disclosure to describe example embodiments. Example embodiments may be modified and implemented in various forms, and the scope of example embodiments is not limited to the descriptions provided in the present specification.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be a computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Example embodiments set forth hereinafter may be used to display a three-dimensional (3D) image. The example embodiments may be implemented as various types of products, for example, personal computers, laptop computers, tablet computers, smartphones, smart pads, televisions, smart home appliances, intelligent vehicles, wearable devices, and digital information displays (DIDs). For example, the example embodiments may be applied to display a 3D image in a smartphone, a mobile device, and a smart pad. Hereinafter, reference will now be made in detail to example embodiments with reference to the accompanying drawings, wherein like reference numerals refer to like elements throughout.

FIG. 1 illustrates operating modes of display devices according to at least one example embodiment.

Referring to FIG. 1, a display device 110 operating in a landscape mode and a display device 120 operating in a portrait mode are illustrated.

The display devices 110 and 120 are devices that may display 3D images in the landscape mode and the portrait mode, respectively. The display devices 110 and 120 may each implement 3D images by providing left and right images to both eyes of a user.

The display device 110 corresponds to the display device 120 rotated 90 degrees. Similarly, the display device 120 corresponds to the display device 110 rotated 90 degrees.

The display devices 110, 120 may include an image processing apparatus (not shown).

The image processing apparatus may include, for example, a data bus, a transmitter, a receiver, a memory, and a processor (i.e., a special purpose processor).

The transmitter, receiver, memory, and processor may send data to and/or receive data from one another using the data bus.

The transmitter is a device that includes hardware and any necessary software for transmitting wireless signals including, for example, data signals, control signals, and other information via one or more connections to other elements of the display device 110, 120. The receiver is a device that includes hardware and any necessary software for receiving wireless signals including, for example, data signals, control signals, and other information via one or more connections to other elements of the display device 110, 120.

The memory may be a device capable of storing data and computer readable instructions. The memory may be a non-transitory computer readable medium such as a magnetic storage, flash storage, etc.

The processor may be a device capable of processing data including, for example, a special purpose processor such as a FPGA, or microprocessor configured to carry out specific operations based on input data, or capable of executing instructions included in computer readable code.

For example, using the processor, the user may select one of the landscape mode and the portrait mode and use a display device in the selected mode, for example, the display device 110 or the display device 120, for purposes. For example, the user may select the landscape mode or portrait mode by changing the orientation of the display device 110, 120 and a sensor within the display device 120 may provide information to the processor indicating the current orientation of the display device 110, 120. In response to the information, the processor may instruct the display device 110, 120 to operate in the selected mode.

Figure 2:
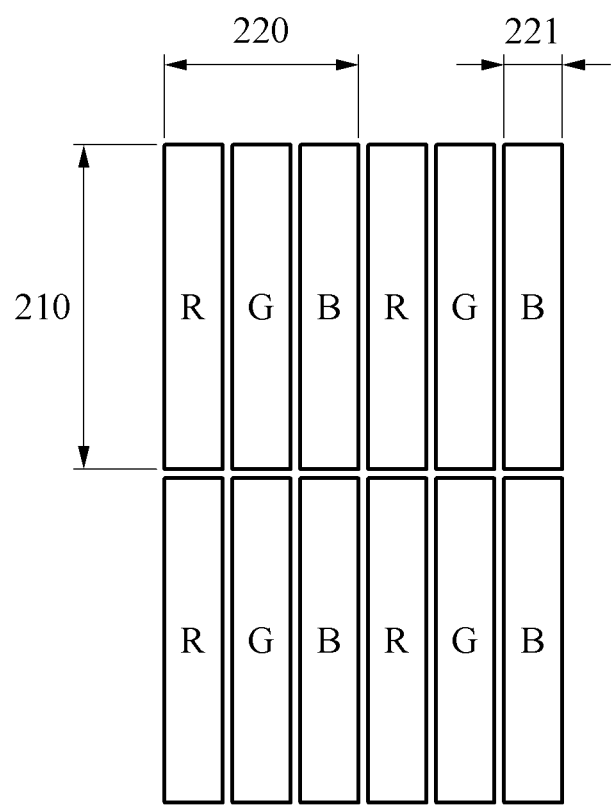
FIGS. 2 and 3 illustrate pixel forms of display devices according to at least one example embodiment.
Figure 3:
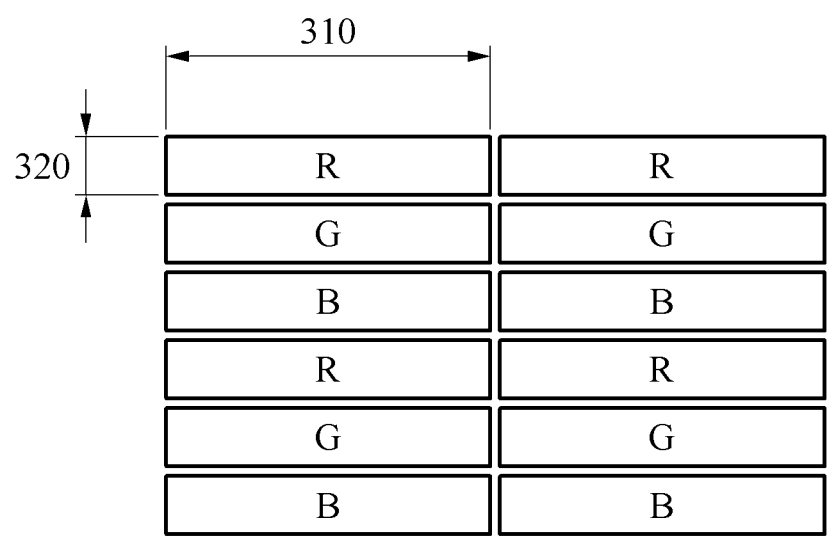

FIGS. 2 and 3 illustrate pixel forms of display devices according to at least one example embodiment.

Referring to FIG. 2, pixels included in a display panel operating in a landscape mode are illustrated.

A pixel may include a plurality of subpixels. For example, in FIG. 2, a pixel may include a subpixel R, a subpixel G, and a subpixel B.

In the landscape mode, short sides of subpixels may be arranged in a horizontal direction, and long sides of the subpixels may be arranged in a vertical direction. In this example, a landscape-pixel height L-Ph 210 may be equal to a landscape-pixel width L-Pw 220. The landscape-pixel width L-Pw 220 may be three times a landscape-subpixel width L-SPw 221. In detail, a relationship between a pixel and a subpixel in the landscape mode may be expressed by Equation 1.

$$L\text{-}Pw = 3 \times L\text{-}SPw$$

$$L\text{-}Pw = L\text{-}Ph \quad \text{[Equation 1]}$$

Referring to FIG. 3, pixels included in a display panel operating in a portrait mode are illustrated.

A pixel of FIG. 3 may correspond to the pixel of FIG. 2 rotated 90 degrees.

In the portrait mode, short sides of subpixels may be arranged in a vertical direction, and long sides of the subpixels may be arranged in a horizontal direction. In this example, a portrait-pixel width P-Pw 310 may be equal to a portrait-subpixel width P-SPw. A portrait-pixel height P-Ph 320 may be one third of the portrait-pixel width P-Pw 310. In detail, a relationship between a pixel and a subpixel in the portrait mode may be expressed by Equation 2.

$$P\text{-}Pw = P\text{-}SPw$$

$$P\text{-}Ph = \tfrac{1}{3} \times P\text{-}Pw \quad \text{[Equation 2]}$$

Figure 4:
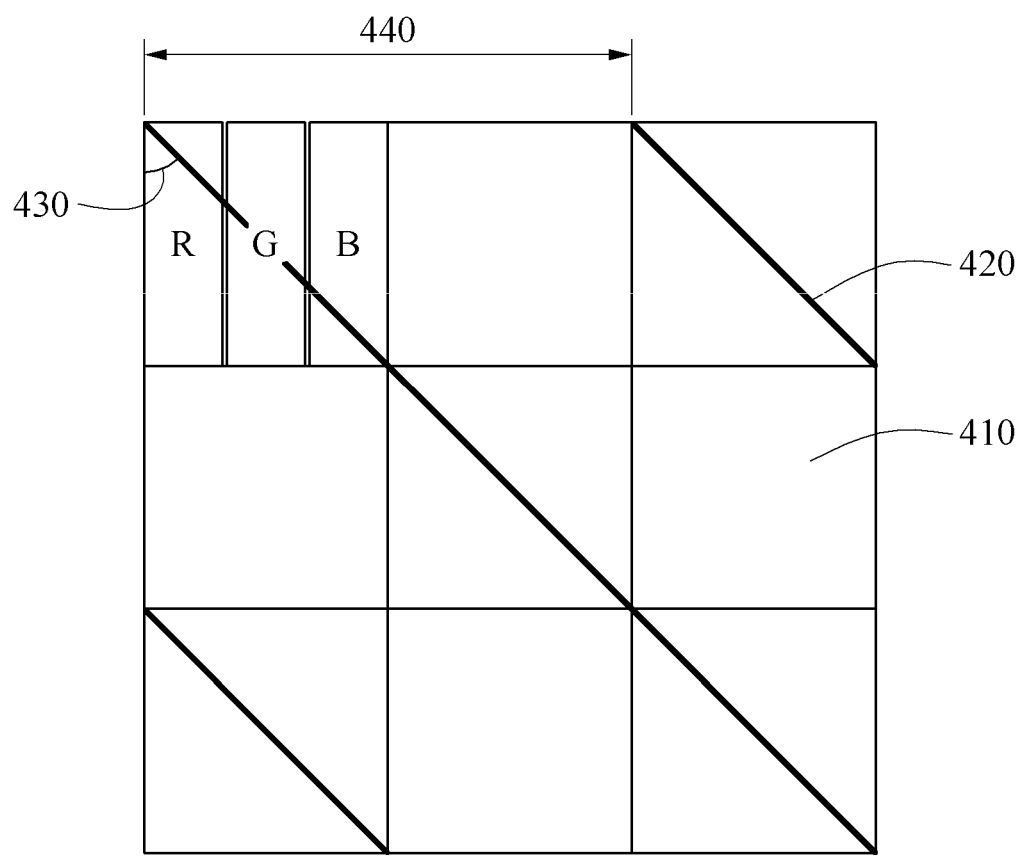
FIGS. 4 and 5 illustrate relationships between pixels and optical components in a landscape mode and a portrait mode according to at least one example embodiment.
Figure 5:
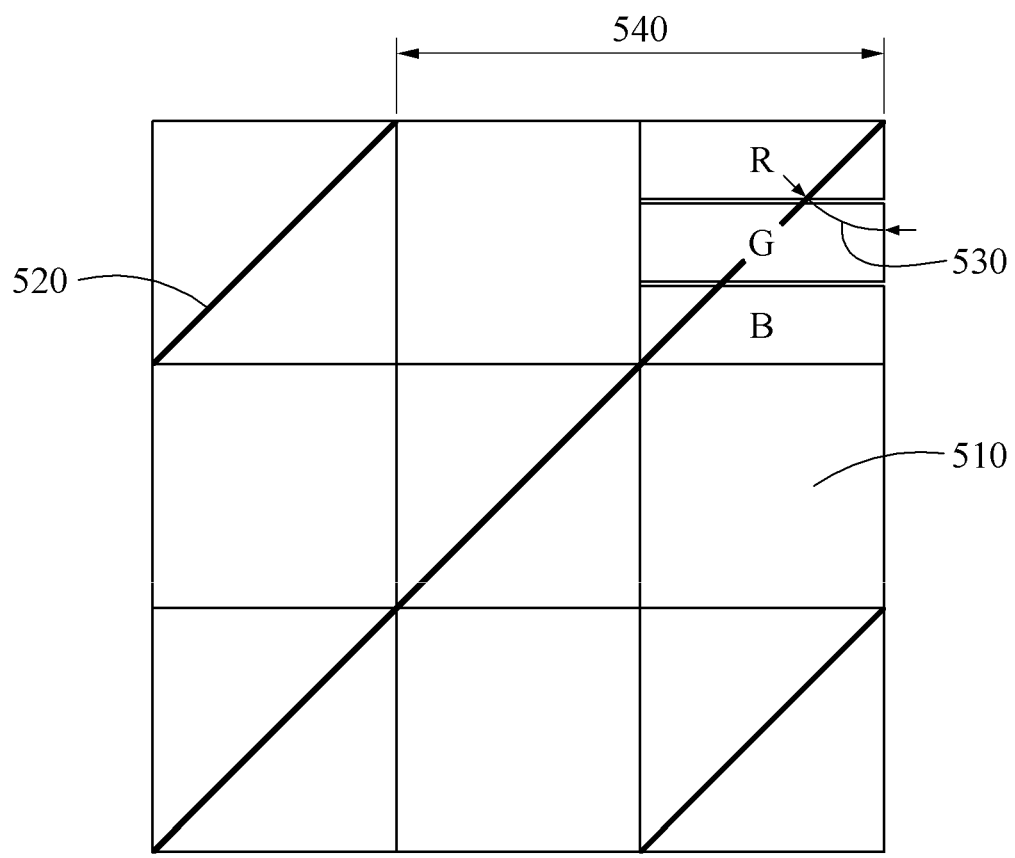

FIGS. 4 and 5 illustrate relationships between pixels and optical components in a landscape mode and a portrait mode according to at least one example embodiment.

Referring to FIG. 4, a pixel 410 included in a display panel operating in a landscape mode, and an optical component 420 included in an optical layer are illustrated.

The pixel 410 is a component included in the display panel and configured to display an image, and may include a plurality of subpixels. In FIG. 4, the pixel 410 may include three subpixels.

The optical component 420 is a component included in the optical layer and configured to selectively transmit and/or refract incident light based on a desired (or, alternatively, a predetermined) rule. For example, the optical component 420 may include a passive 3D optical component such as a parallax barrier and a lenticular lens, and an active 3D optical component such as a liquid crystal barrier and an electro-wetting element.

The optical component 420 may be disposed to be slanted a desired (or, alternatively, a predetermined) angle 430 with respect to the pixel 410 included in the display panel. Here, the predetermined angle 430 may be a slant angle at which the optical component 420 is slanted with respect to a vertical component of the pixel 410. In the landscape mode, the slant angle may be determined based on a long side of a subpixel included in the pixel 410.

Further, optical components 420 may be disposed at an interval of a desired (or, alternatively, a predetermined) distance 440. The distance 440 may be a pitch indicating an interval between a plurality of optical components included in the optical layer.

Referring to FIG. 5, a pixel 510 included in a display panel operating in a portrait mode, and an optical component 520 included in an optical layer are illustrated.

The pixel 510 and the optical component 520 of FIG. 5 correspond to the pixel 410 and the optical component 420 of FIG. 4 rotated 90 degrees.

The optical component 520 may be disposed to be slanted a desired (or, alternatively, a predetermined) angle 530 with respect to the pixel 510. Here, the angle 530 may be a slant angle at which the optical component 520 is slanted with respect to a vertical component of the pixel 510. In the portrait mode, the slant angle may be determined based on a short side of a subpixel included in the pixel 510.

Further, optical components 520 may be disposed at an interval of a desired (or, alternatively, a predetermined) distance 540. The distance 540 may be a pitch indicating an interval between a plurality of optical components included in the optical layer.

Figure 6:
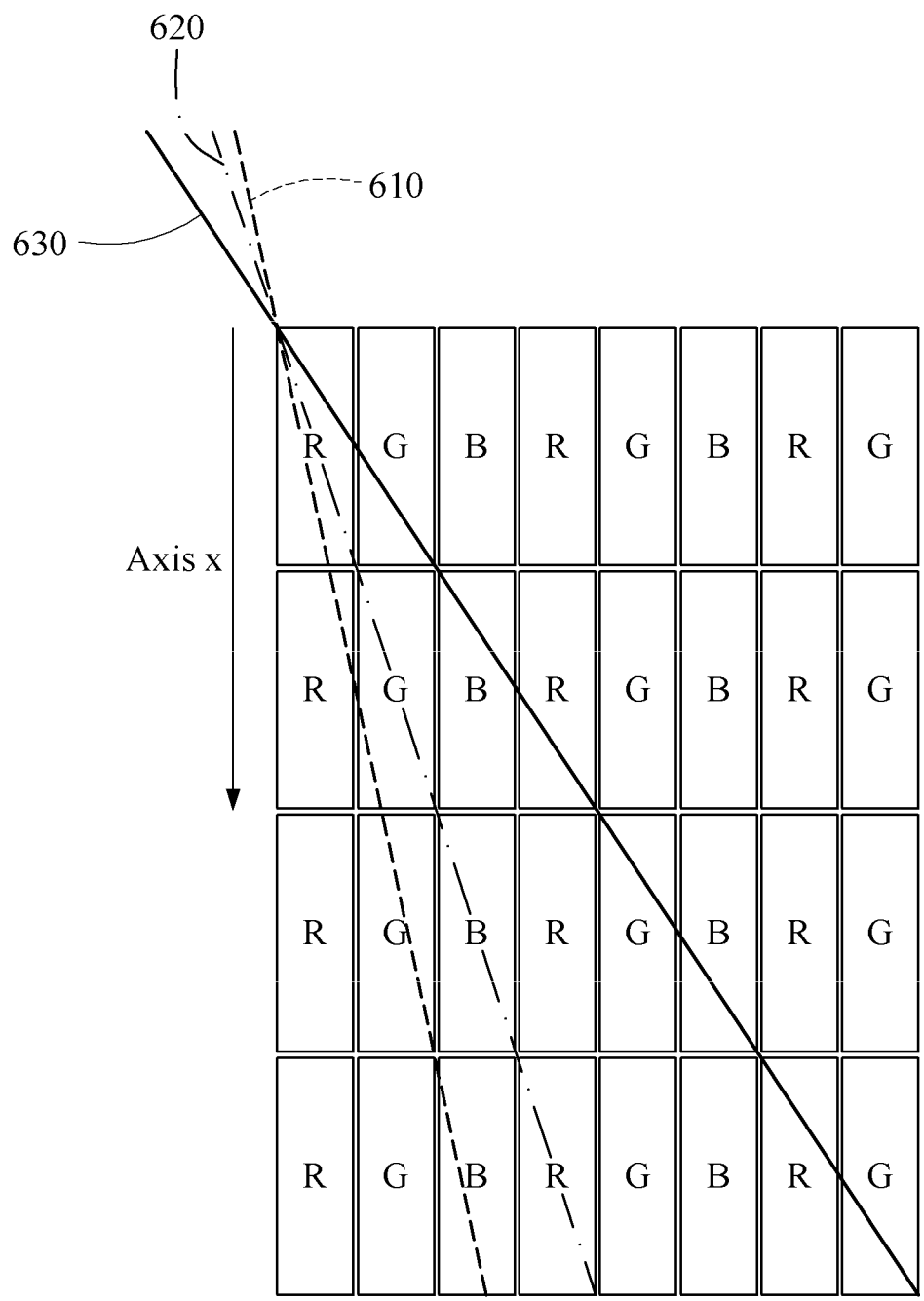
FIGS. 6, 7, and 8 illustrate slant angles in a landscape mode and a portrait mode according to at least one example embodiment.
Figure 7:
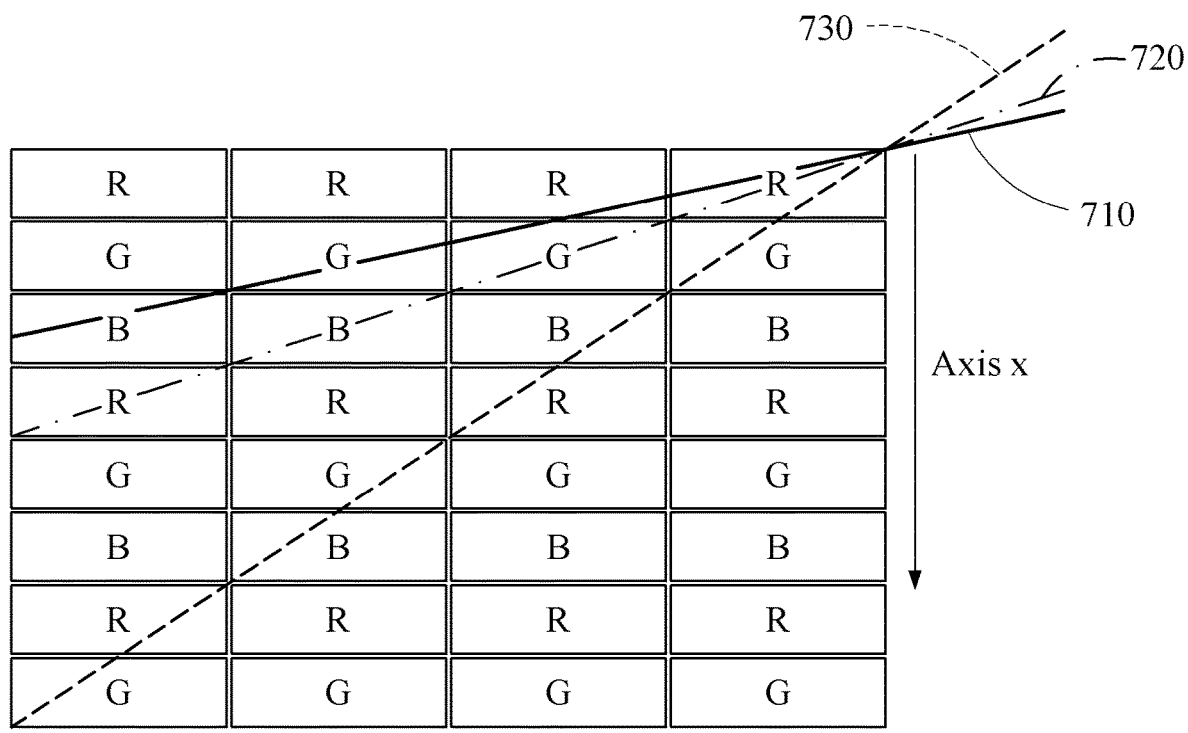
Figure 8:
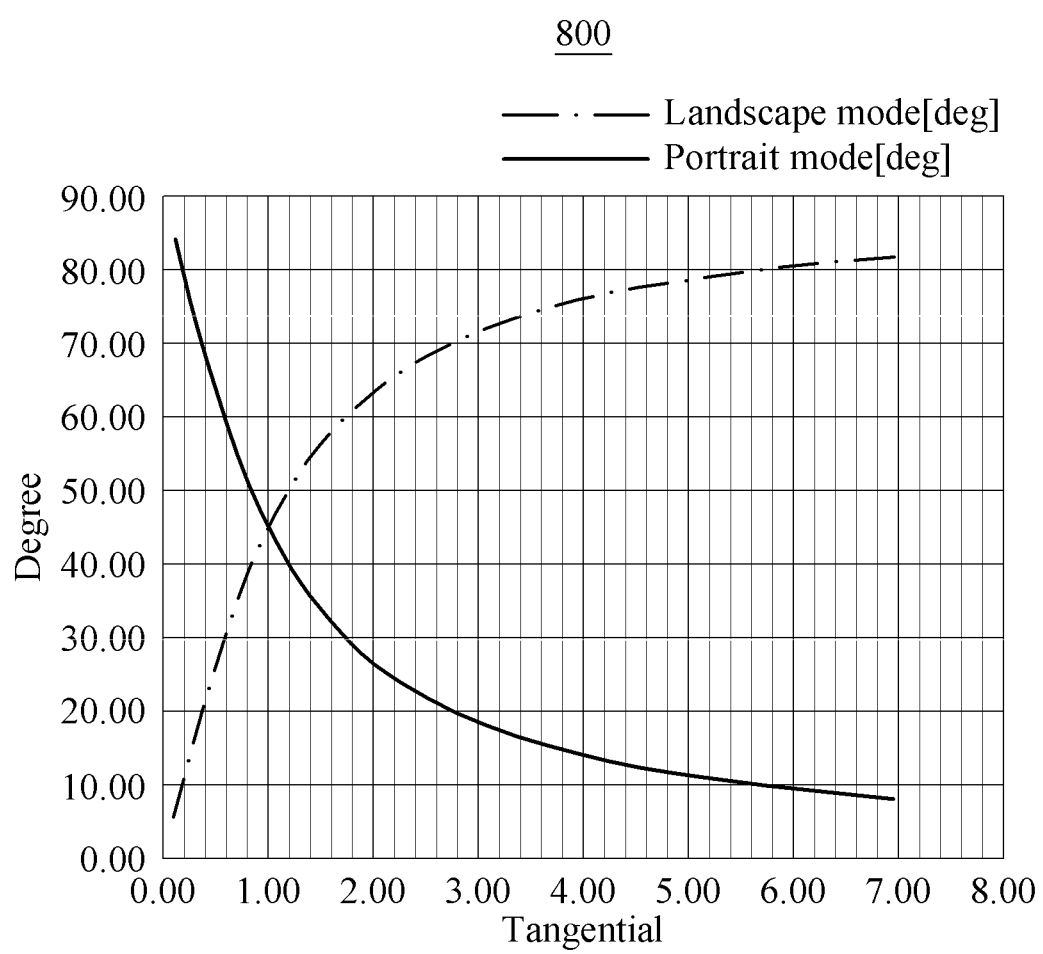

FIGS. 6 through 8 illustrate slant angles in a landscape mode and a portrait mode according to at least one example embodiment.

Referring to FIG. 6, optical components having various slant angles in a landscape mode are illustrated.

A first optical component 610 may be disposed at a slant angle of 12 degrees with respect to an axis x. A second optical component 620 may be disposed at a slant angle of 18 degrees with respect to the axis x. A third optical component 630 may be disposed at a slant angle of 40 degrees with respect to the axis x.

The slant angles of the optical components may be expressed as tangential gradients with respect to subpixels included in a display panel. A tangential gradient may express a slant angle as a variance in horizontal subpixels with respect to vertical subpixels. By expressing the slant angle as the tangential gradient, the slant angle may be expressed irrespective of a physical change in sizes of subpixels.

For example, the slant angle of 12 degrees for the first optical component 610 may be expressed as a tangential gradient of 2/3 which passes through two subpixels in a horizontal direction when passing through three subpixels in a vertical direction. The slant angle of 18 degrees for the second optical component 620 may be expressed as a tangential gradient of 3/3 which passes through three subpixels in the horizontal direction when passing through three subpixels in the vertical direction. The slant angle of 40 degrees for the third optical component 630 may be expressed as a tangential gradient of 6/3 which passes through six subpixels in the horizontal direction when passing through three subpixels in the vertical direction.

Referring to FIG. 7, optical components having various slant angles in a portrait mode are illustrated. A first optical component 710, a second optical component 720, and a third optical component 730 of FIG. 7 may correspond to the first optical component 610, the second optical component 620, and the third optical component 630 of FIG. 6 rotated 90 degrees, respectively.

In a case in which a slant angle in a landscape mode is denoted as $\theta_L$ and a slant angle in a portrait mode is denoted as $\theta_P$, the slant angle $\theta_L$ in the landscape mode and the slant angle $\theta_P$ in the portrait mode may be expressed by Equation 3.

$$\theta_L = 360 - \theta_P \quad \text{[Equation 3]}$$

Thus, a slant angle of the first optical component 710 of FIG. 7 may be expressed as 348 degrees. A slant angle of the second optical component 720 may be expressed as 342 degrees. A slant angle of the third optical component 730 may be expressed as 320 degrees.

Further, in a case of expressing the slant angle $\theta_L$ in the landscape mode and the slant angle $\theta_P$ in the portrait mode as absolute values with respect to an axis x, the slant angle $\theta_L$ in the landscape mode and the slant angle $\theta_P$ in the portrait mode may also be expressed by Equation 4.

$$\theta_L + \theta_P = 90 \quad \text{[Equation 4]}$$

Thus, the slant angle of the first optical component 710 may be expressed as 78 degrees with respect to the axis x. The slant angle of the second optical component 720 may be expressed as 72 degrees with respect to the axis x. The slant angle of the third optical component 730 may be expressed as 50 degrees with respect to the axis x.

In addition, in a case of expressing the slant angles of FIG. 7 as tangential gradients, the slant angle of 348 degrees for the first optical component 710 may be expressed as a tangential gradient of 4/3 which passes through four subpixels in a horizontal direction when passing through three subpixels in a vertical direction. The slant angle of 342 degrees for the second optical component 720 may be expressed as a tangential gradient of 3/3 which passes through three subpixels in the horizontal direction when passing through three subpixels in the vertical direction. The slant angle of 320 degrees for the third optical component 730 may be expressed as a tangential gradient of ⅔ which passes through two subpixels in the horizontal direction when passing through three subpixels in the vertical direction.

Referring to FIG. 8, a relationship between absolute values of slant angles in a landscape mode and a portrait mode with respect to a tangential gradient and an axis x is illustrated.

In a graph 800, an axis x indicates a tangential gradient, and an axis y indicates an absolute value of an angle with respect to the axis x. Further, a dash-dot line indicates a slant angle in the landscape mode, and a solid line indicates a slant angle in the portrait mode.

Figure 9:
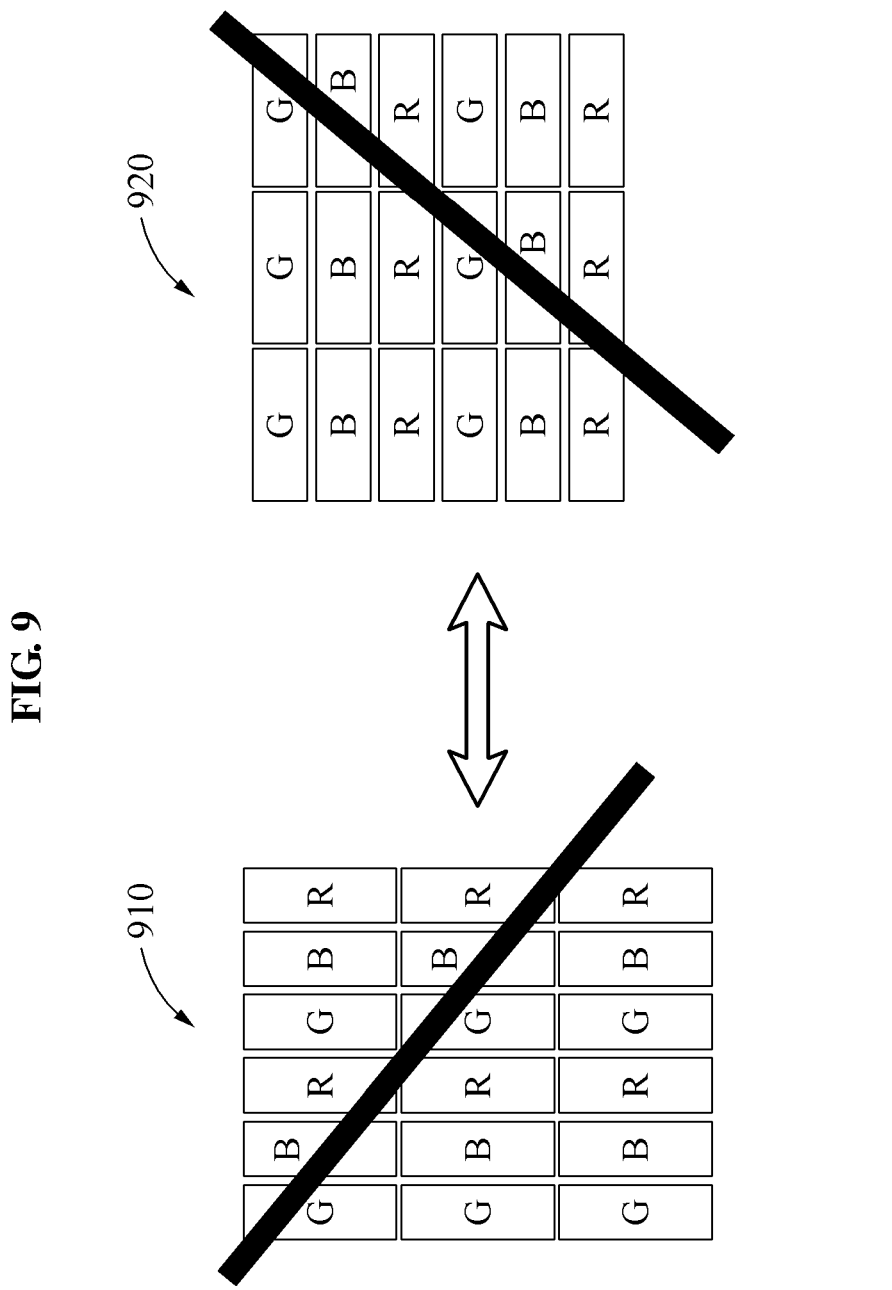
FIGS. 9 and 10 illustrate view densities according to at least one example embodiment.
Figure 10:
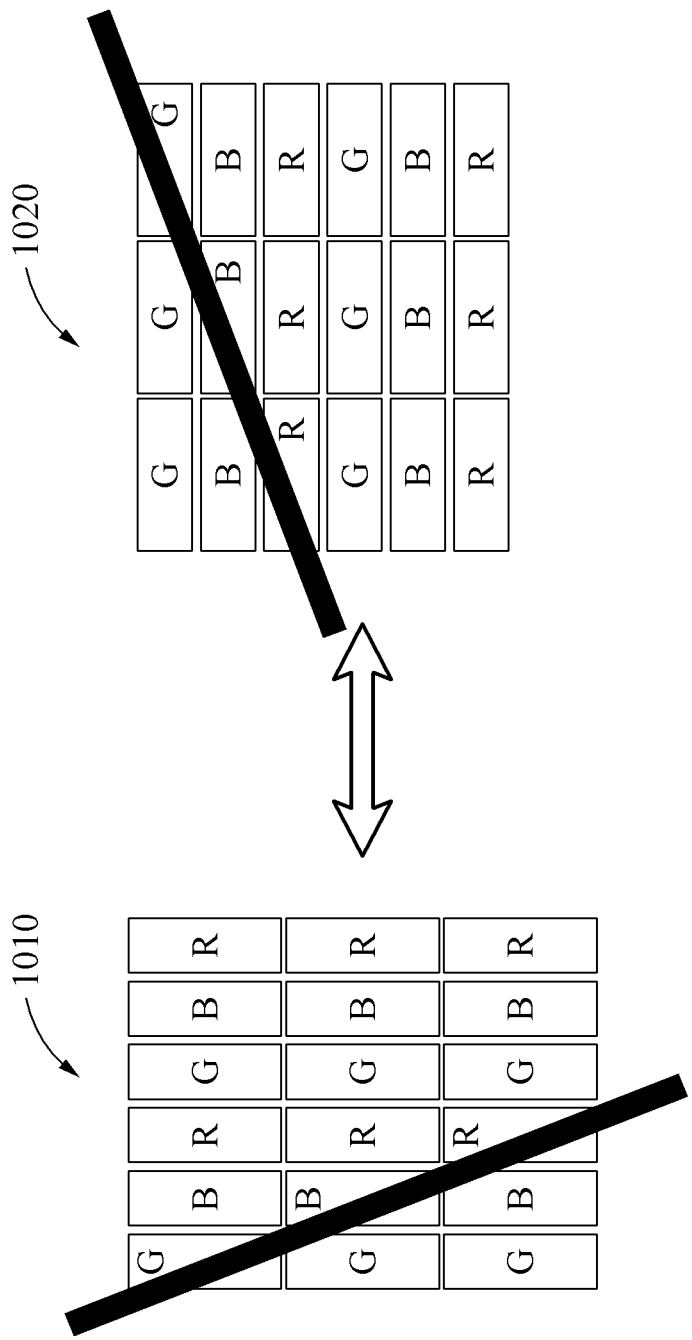

FIGS. 9 and 10 illustrate view densities according to at least one example embodiment.

Referring to FIG. 9, a display panel 910 operating in a landscape mode, and a display panel 920 operating in a portrait mode are illustrated.

A view density is a value expressing a density of subpixels displaying a 3D image. For example, the view density may be expressed as pixels per inch (PPI) or pixels per centimeter (PPCM). As a number of subpixels displaying a 3D image increases, the view density may increase. Conversely, as the number of subpixels displaying a 3D image physically decreases, the view density may decrease.

In FIG. 9, an optical component having a slant angle of 45 degrees, in detail, a tangential gradient of "1", is illustrated. In this example, at least three subpixels in a horizontal direction and one subpixel in a vertical direction may be needed to display a 3D image. Accordingly, a minimum number of pixels needed to display a 3D image in the landscape mode may be three times greater than a minimum number of pixels needed to display a 3D image in the portrait mode. In detail, the view density in the landscape mode may be three times the view density in the portrait mode.

Referring to FIG. 10, a display panel 1010 operating in a landscape mode, and a display panel 1020 operating in a portrait mode are illustrated.

In FIG. 10, an optical component having a slant angle corresponding to a tangential gradient of ⅓ is illustrated. In this example, at least three subpixels in a horizontal direction and three subpixels in a vertical direction may be needed to display a 3D image. Accordingly, a minimum number of pixels needed to display a 3D image in the landscape mode may be equal to a minimum number of pixels needed to display a 3D image in the portrait mode. In detail, the view density in the landscape mode may be equal to the view density in the portrait mode.

Figure 11:
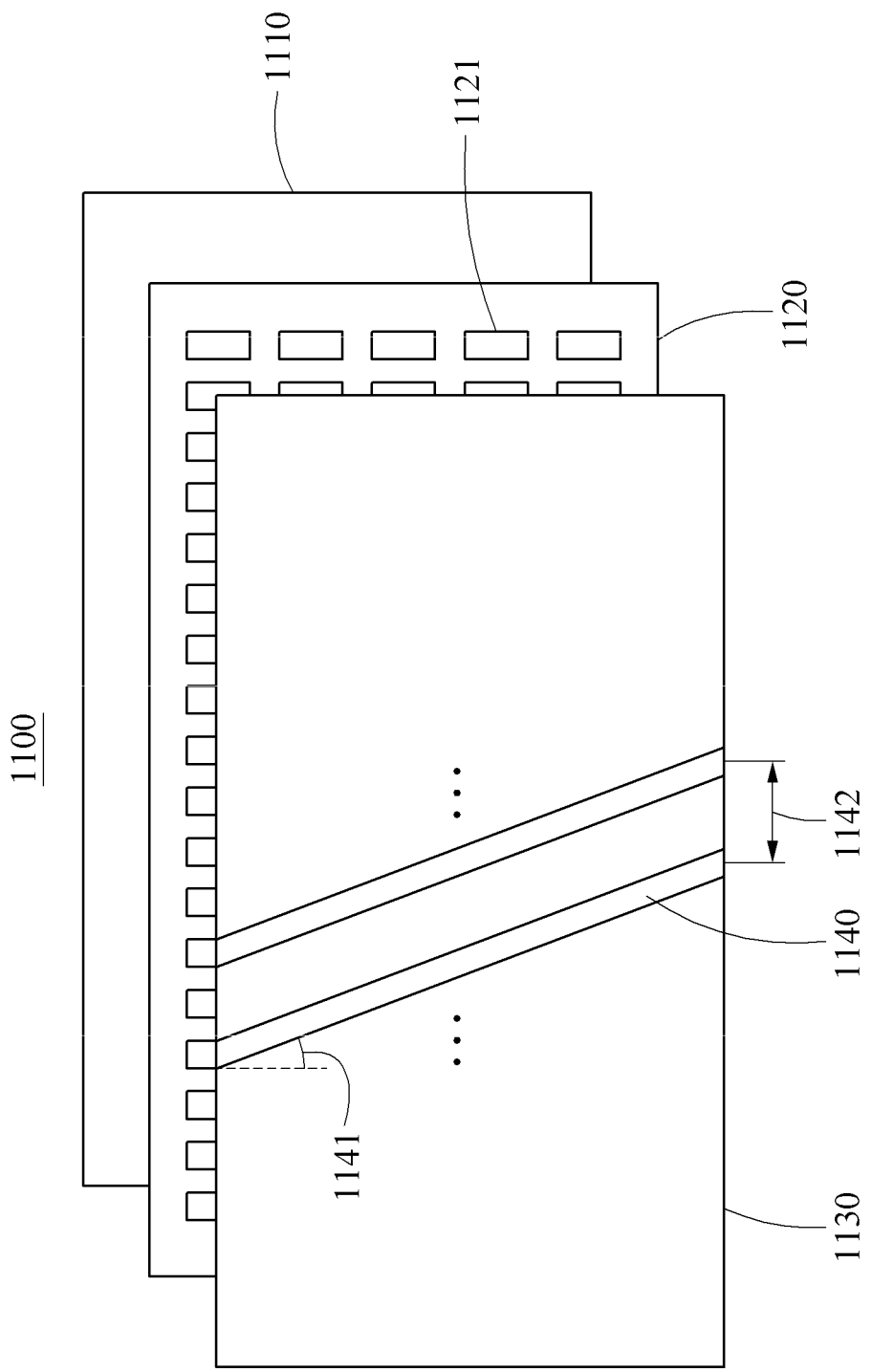
FIGS. 11 and 12 illustrate display devices according to at least one example embodiment.
Figure 12:
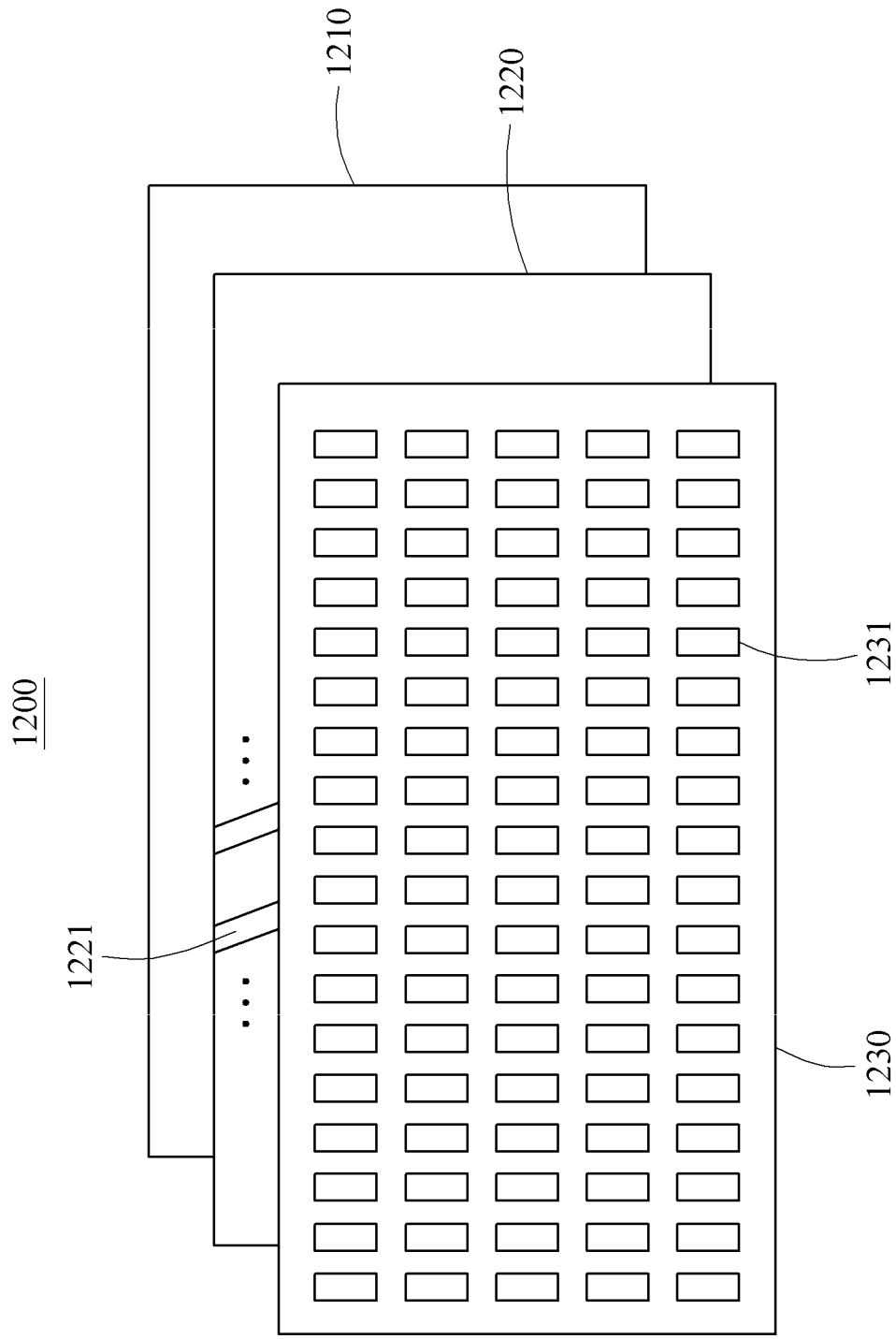

FIGS. 11 and 12 illustrate display devices according to at least one example embodiment.

Referring to FIG. 11, a display device 1100 may include a backlight unit (BLU) 1110, a display panel 1120, and an optical layer 1130.

The BLU 1110 may be a device configured to provide light to the display panel 1120. The BLU 1110 may include, for example, a light source and a light guide plate. The BLU 1110 may include an edge-type BLU in which a light source and a light guide plate are disposed on a side, and a direct-type BLU in which a light source and a light guide plate are disposed on a rear side.

The display panel 1120 may be a device configured to receive light from the BLU 1110 and display a 3D image. The display panel 1120 may include a plurality of pixels 1121.

The optical layer 1130 may be a layer configured to selectively transmit or refract incident light based on a desired (or, alternatively, a predetermined) rule. The optical layer 1130 may include a plurality of optical components 1140. The optical layer 1130 may provide light incident from the display panel 1120 to both eyes of a viewer by selectively transmitting or refracting the light based on the rule.

The optical components 1140 may be slanted a slant angle θ 1141 with respect to a pixel 1121 included in the display panel 1120, and disposed at an interval of a pitch l 1142.

3D resolutions in a landscape mode and a portrait mode may be expressed using optical view #, as given by Equation 5.

$$3D\ \text{resolution} = \frac{1}{\text{optical view \#}} \quad \text{[Equation 5]}$$

In detail, when the resolution in the landscape mode is denoted as $R_L$ and the resolution in the portrait mode is denoted as $R_P$, Equation 6 may be derived.

$$R_L = 3l \quad \text{[Equation 6]}$$
$$R_P = \frac{l}{a}$$

In Equation 6, a corresponds to tan θ, and denotes a parameter expressing a slant angle as a tangential gradient.

In a case in which a viewing angle in the landscape mode is denoted as $VA_L$ and a viewing angle in the portrait mode is denoted as $VA_P$, a relationship between the slant angle θ 1141 and the pitch l 1142 may be expressed by Equation 7.

$$l = 2g \times \tan(VA_L/2)$$
$$a = l/(2g \times \tan(VA_P/2)) \quad \text{[Equation 7]}$$

In view of a general situation, viewing angles required in the landscape mode and the portrait mode may be calculated as follows. A minimum viewing angle may be set based on an inter-pupil distance (IPD) of 6.5 centimeters (cm) and a viewing distance of 60 cm in a case of a personal tablet. A maximum value of the viewing angle $VA_L$ in the landscape mode may be set based on a horizontal direction of 160 cm and a viewing distance of 150 cm in a case of a 42-inch TV. A maximum value of the viewing angle $VA_P$ in the portrait mode may be set based on a horizontal direction of 120 cm and a viewing distance of 150 cm in a case of a 42-inch DID. Based on the set values, ranges of the viewing angles $VA_L$ and $VA_P$ may be expressed as given by Equation 8.

$$3\ \text{degrees} < VA_L < 30\ \text{degrees}, 3\ \text{degrees} < VA_P < 20\ \text{degrees} \quad \text{[Equation 8]}$$

However, the maximum values of the viewing angles $VA_L$ and $VA_P$ may change based on a size of a display panel. As the size of the display panel increases, the maximum values of the viewing angles $VA_L$ and $VA_P$ may increase as well.

In the foregoing calculation, a gap g between the display panel 1120 and the optical layer 1130 may be a significant factor. The gap g may be considered as $T_{EFF}$ as expressed by Equation 9.

$$T_{EFF} = \frac{T_a}{n_m} \quad \text{[Equation 9]}$$

In Equation 9, $T_{EFF}$ may indicate an actual gap in a case in which a refractive index of air is expressed by $n_a=1$, a refractive index between the display panel 1120 and the optical layer 1130 is expressed by $n_m \ne 1$, and a thickness at $n_a$ is expressed by $T_a$. $T_{EFF}$ may be determined based on a gap glass, a display panel glass, and a polarizing plate.

Based on $T_{EFF}$ of Equation 9, the gap g between the display panel 1120 and the optical layer 1130 may be calculated as expressed by Equation 10.

$$0 \text{ mm} < g < 7.153 \text{ mm} \quad \text{[Equation 10]}$$

Equation 10 may indicate a range of the gap g in a case of $n_m=1.5$. In a case of $n_m=1$, the gap g may have a range as expressed by Equation 11.

$$0 \text{ mm} < g < 10 \text{ mm} \quad \text{[Equation 11]}$$

In Equation 11, a maximum value of 10 millimeters (mm) is a value obtained considering that the gap g between the display panel 1120 and the optical layer 1130 may not exceed 10 mm based on a thickness of a TV. The ranges of the gap g as expressed in Equations 10 and 11 are provided as examples only. The gap g may have a range varying based on set conditions.

Based on the set conditions and the calculated range of gap g, specific ranges of the slant angle θ 1141 and the pitch l 1142 may be calculated.

The slant angle θ 1141 may have a range of $0.4 < a = \tan \theta < 1$. For example, in a case in which a horizontal length of a pixel corresponds to 0.1815 mm and a horizontal length of a subpixel corresponds to 0.0605 mm, the range of the slant angle θ 1141 may be expressed as 21.8 degrees<θ<45 degrees.

The pitch l 1142 may have a range of 1 pixel<l<8 pixel based on a pixel included in the display panel 1120. For example, in a case in which the horizontal length of the pixel corresponds to 0.1815 mm, the range of the pitch l 1142 may be expressed as 0.1815 mm<l<1.452 mm.

Referring to FIG. 12, a display device 1200 may include a BLU 1210, an optical layer 1220, and a display panel 1230.

The BLU 1210 may be a device configured to provide light to the display panel 1230. The BLU 1210 may include, for example, a light source and a light guide plate.

The optical layer 1220 may be a layer configured to selectively transmit or refract incident light based on a desired (or, alternatively, a predetermined) rule. The optical layer 1220 may include a plurality of optical components 1221. For example, the optical layer 1220 may provide light emitted from the BLU 1210 to the display panel 1230 by selectively transmitting or refracting the light based on the desired (or, alternatively, the predetermined) rule.

The display panel 1230 may be a device configured to receive light from the optical layer 1220 and display a 3D image. The display panel 1230 may include a plurality of pixels 1231.

The descriptions provided with reference to FIG. 11 may be applicable to the components illustrated in FIG. 12, and thus duplicated descriptions will be omitted for conciseness.

Figure 13:
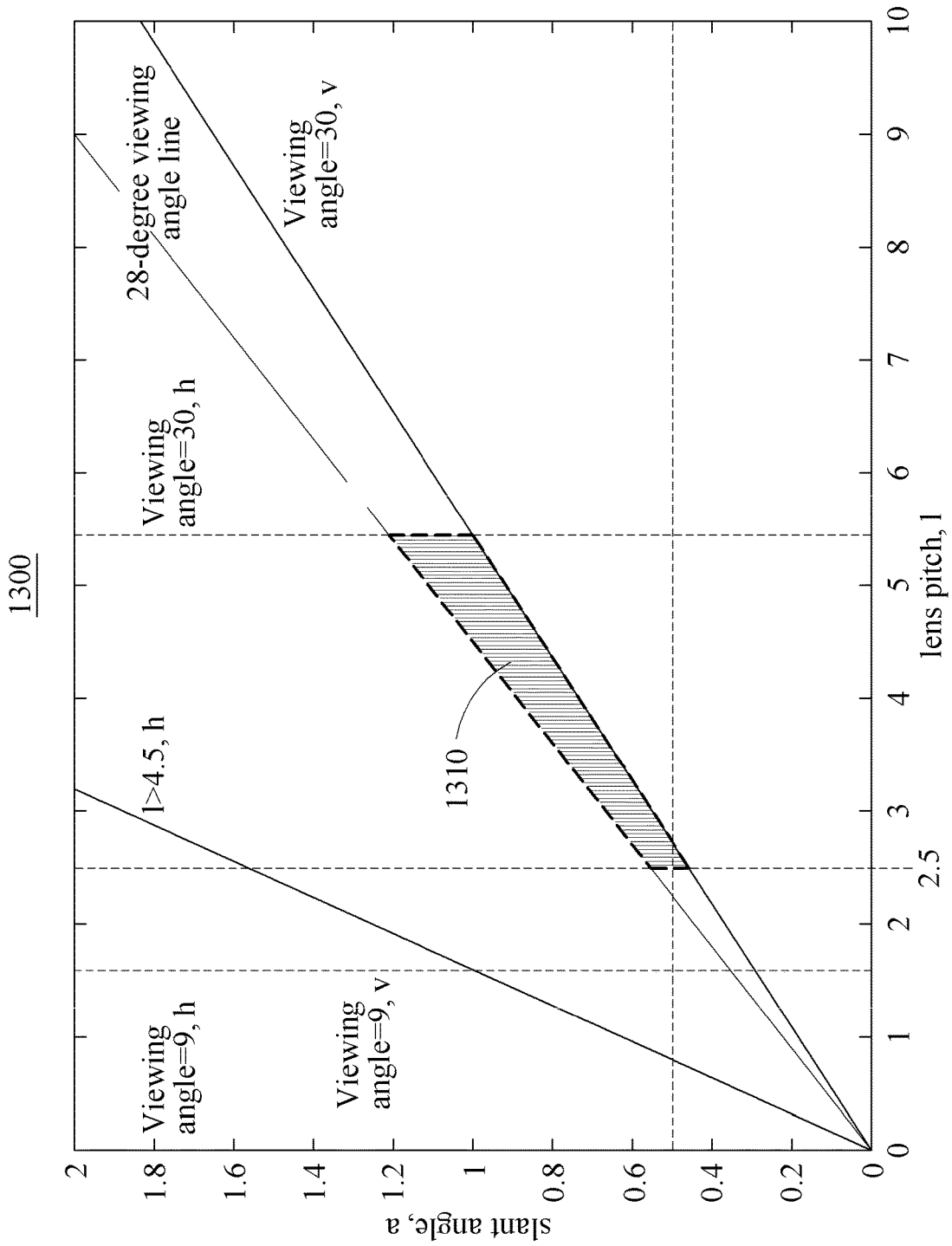
FIG. 13 illustrates a process of determining a slant angle and a pitch according to at least one example embodiment.

FIG. 13 illustrates a process of determining a slant angle and a pitch according to at least one example embodiment.

Referring to FIG. 13, a graph 1300 showing a relationship between a slant angle and a pitch is illustrated.

In view of the relationship between the slant angle and the pitch, a desired (or, alternatively, an optimal or near optimal) range 1310 with respect to the slant angle and the pitch may be determined.

For example, in a case in which design conditions with respect to an optical layer, the design conditions that a gap between a display panel and the optical layer corresponds to $T_{EFF}=1.86$, an optical viewpoint is greater than a viewpoint of 4.5, and a viewing angle ranges between 9 degrees and 30 degrees, are set, the optimal range 1310 with respect to the slant angle and the pitch may be derived. However, the optimal range 1310 of FIG. 13 is an example range. The slant angle and the pitch may have an optimal range varying based on the design conditions with respect to the optical layer.

Example embodiments may implement a 3D image in a landscape mode and a portrait mode using only an optical layer by determining a desired (or, alternatively, an optimal or near optimal) slant angle and pitch with respect to an optical layer.

Example embodiments may prevent an unnecessary increase in thickness and cost for manufacturing a display device by disposing optical components on an optical layer in view of an optimal relationship between a slant angle and a pitch without the need of an additional optical component.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical layer comprises:
    optical components slanted an angle θ with respect to a pixel included in a display panel, each of the optical components spaced apart at a pitch l,
    wherein, for any and all pitches between at least a horizontal length of the pixel and 8 times the horizontal length of the pixel, the angle θ is determined based on the pitch l, a gap between the display panel and the optical layer and a viewing angle when the display panel is operating in a portrait mode according to 1 Equations 1 and 2, and
    wherein, for any and all pitches between at least a horizontal length of the pixel and 8 times the horizontal length of the pixel, the pitch l is determined based on the gap and a viewing angle when the display panel is operating in a landscape mode according to Equation 1, $l = 2g \times \tan(VA_L/2)$  [Equation 1]

$a = l/(2g \times \tan(VA_P/2))$  [Equation 2]

wherein a corresponds to tan θ, g denotes one of (i) a gap between a top of the display panel and a bottom of the optical layer when the display panel is behind the optical layer and (ii) a gap between a top of the optical layer and a bottom of the display panel when the display panel is in front of the optical layer, $VA_L$ denotes the viewing angle when the display panel is operating in the landscape mode, and $VA_P$ denotes the viewing angle when the display panel is operating in the portrait mode.

2. The optical layer of claim 1, wherein the angle θ satisfies 0.4<a=tan θ<1.

3. The optical layer of claim 1, wherein the pitch l satisfies 1 pixel<l<8 pixel with respect to the pixel included in the display panel.

4. The optical layer of claim 1, wherein the angle θ is the slant angle at which the optical components are slanted with respect to a vertical component of the pixel included in the display panel.

5. The optical layer of claim 1, wherein each of the viewing angle $VA_L$ and the viewing angle $VA_P$ has a minimum value of 3 degrees and a maximum value proportional to a size of the display panel.

6. The optical layer of claim 5, wherein the maximum value of the viewing angle $VA_L$ is greater than the maximum value of the viewing angle $VA_P$.

7. The optical layer of claim 1, wherein the optical components include at least one of a parallax barrier and a lenticular lens, the parallax barrier configured to selectively transmit light incident to the optical layer, and the lenticular lens configured to refract light incident to the optical layer based on a rule.

8. The optical layer of claim 1, wherein the optical components include at least one of a liquid crystal barrier and an electro-wetting element corresponding to active three-dimensional (3D) optical devices.

9. The optical layer of claim 1, wherein the optical layer is configured to provide light emitted from a backlight unit (BLU) to the display panel by selectively transmitting or refracting the light based on a rule.

10. The optical layer of claim 1, wherein
    the display panel is configured to display a 3D image using light emitted from a backlight unit (BLU), and
    the optical layer is configured to provide light incident from the display panel to a user by selectively transmitting or refracting the light based on a rule.

11. A display device comprising:
    a backlight unit (BLU);
    a display panel configured to display an image using light generated by the BLU; and
    an optical layer including optical components slanted an angle θ with respect to a pixel included in the display panel, and each of the optical components spaced apart a pitch l, wherein
    the angle θ satisfies 0.4<a=tan θ<1, and
    the pitch l satisfies 1 pixel<l<8 pixel with respect to the pixel included in the display panel,
    wherein, for any pitch between at least a horizontal length of the pixel and 8 times the horizontal length of the pixel, the angle θ is determined based on the pitch l, a gap between the display panel and the optical layer and a viewing angle when the display panel is operating in a portrait mode according to Equations 1 and 2, and
    wherein, for any pitch between at least a horizontal length of the pixel and 8 times the horizontal length of the pixel, the pitch l is determined based on the gap and a viewing angle when the display panel is operating in a landscape mode according to Equation 1, $l = 2g \times \tan(VA_L/2)$  [Equation 1]

$a = l/(2g \times \tan(VA_P/2))$  [Equation 2]

wherein a corresponds to tan θ, g denotes one of (i) a gap between a top of the display panel and a bottom of the optical layer when the display panel is behind the optical layer and (ii) a gap between a top of the optical layer and a bottom of the display panel when the display panel is in front of the optical layer, $VA_L$ denotes the viewing angle when the display panel is operating in the landscape mode, and $VA_P$ denotes the viewing angle when the display panel is operating in the portrait mode.

12. The display device of claim 11, wherein each of the viewing angle $VA_L$ and the viewing angle $VA_P$ has a minimum value of 3 degrees and a maximum value proportional to a size of the display panel.

13. The display device of claim 11, wherein the optical components include one or more of a parallax barrier, a lenticular lens, a liquid crystal barrier, and an electro-wetting element.

14. The display device of claim 11, wherein the optical layer is configured to provide light emitted from the BLU to the display panel by selectively transmitting or refracting the light based on a rule.

15. The display device of claim 11, wherein
the display panel is configured to display a three-dimensional (3D) image using light emitted from the BLU, and
the optical layer is configured to provide light incident from the display panel to a user by selectively transmitting or refracting the light based on a rule.

* * * * *